US006920339B1

United States Patent
Choy et al.

(10) Patent No.: US 6,920,339 B1
(45) Date of Patent: Jul. 19, 2005

(54) ENHANCED FEATURE ACCESS VIA KEYPAD AND DISPLAY IN A USER TERMINAL OF A COMMUNICATION SYSTEM

(75) Inventors: Vincent H. Choy, Hazlet, NJ (US); Petagay Maria Cruz, Long Branch, NJ (US); Veda Gundanna, Matawan, NJ (US); Shabbir Amirali Khakoo, Morganville, NJ (US); Stephen M. Milton, Freehold, NJ (US)

(73) Assignee: Avaya Technology Corp., Basking Ridge, NJ (US)

( * ) Notice: Subject to any disclaimer, the term of this patent is extended or adjusted under 35 U.S.C. 154(b) by 0 days.

(21) Appl. No.: 09/517,890

(22) Filed: Mar. 3, 2000

(51) Int. Cl.$^7$ ................................................ H04B 1/38
(52) U.S. Cl. ..................... 455/566; 455/414.1; 455/575
(58) Field of Search ................................. 455/566, 560, 455/414.1, 550.1, 95, 575; 379/93.05, 93.09, 157, 201.01, 207.03, 207.02, 207.11, 368, 369, 433.06, 433.07

(56) References Cited

U.S. PATENT DOCUMENTS

| 5,572,572 A | | 11/1996 | Kawan et al. ................. 379/98 |
| 5,615,257 A | | 3/1997 | Pezzullo et al. .............. 379/396 |
| 5,794,156 A | | 8/1998 | Alanara ......................... 455/517 |
| 6,044,403 A | * | 3/2000 | Gerszberg et al. ............ 709/225 |
| 6,204,848 B1 | * | 3/2001 | Nowlan et al. ............... 345/352 |
| 6,215,474 B1 | * | 4/2001 | Shah ............................ 455/550 |
| 6,463,304 B2 | * | 10/2002 | Smethers ..................... 455/566 |
| 6,546,239 B1 | * | 4/2003 | Pazdersky et al. ........... 455/410 |
| 6,554,707 B1 | * | 4/2003 | Sinclair et al. .............. 455/461 |

FOREIGN PATENT DOCUMENTS

| JP | 05-260176 | 10/1993 |
| JP | 09-135320 | 5/1997 |

OTHER PUBLICATIONS

Bellcore Analog Display Services Interface (ADSI) SPCS/Server Generic Requirements, Document GR–1273–CORE, Issue 1, 32 pages, Jul. 1998.

* cited by examiner

*Primary Examiner*—Edward F. Urban
*Assistant Examiner*—Thuan Nguyen
(74) *Attorney, Agent, or Firm*—Ryan, Mason & Lewis, LLP

(57) ABSTRACT

A wireless terminal or other type of user terminal in a communication system is configured so as to be permitted to enter an enhanced feature access mode based at least in part on a communication of designated information between the user terminal and a corresponding switch of the system. The designated information may comprise, e.g., a feature access code associated with the enhanced feature access mode and entered by a user at the user terminal, or a pre-specified signal transmitted from the user terminal to the switch of the system. When in the enhanced feature access mode, the user terminal is provided with navigation and activation mechanisms which utilize a keypad of the user terminal in conjunction with a display of the user terminal to provide access to features of the communication system from the user terminal. For example, the navigation and activation mechanisms may each utilize disjoint subsets of a given set of keys on a terminal keypad, e.g., an otherwise conventional 12-key keypad.

28 Claims, 2 Drawing Sheets

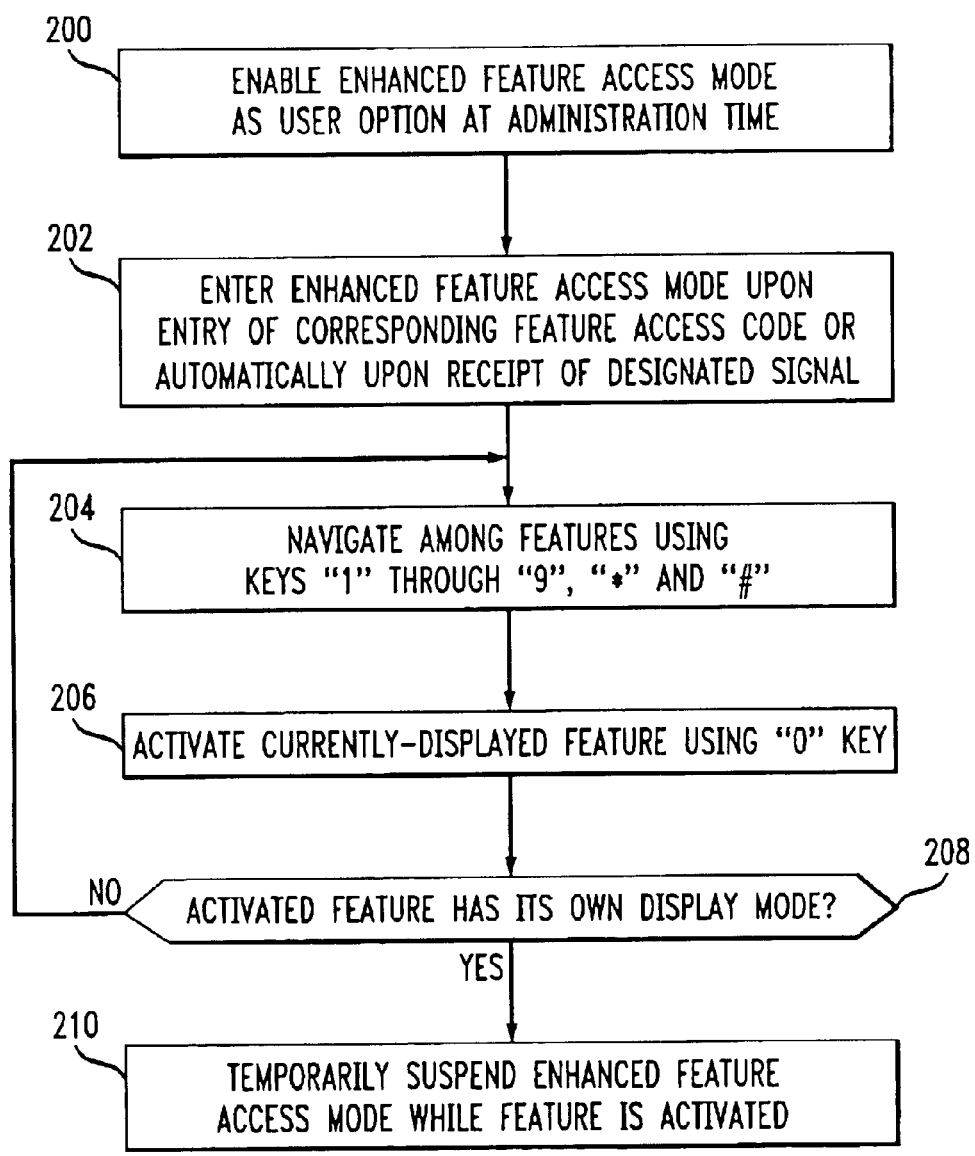

ENHANCED FEATURE ACCESS VIA KEYPAD AND DISPLAY IN A USER TERMINAL OF A COMMUNICATION SYSTEM

FIELD OF THE INVENTION

The invention relates generally to communication systems, and more particularly to communication systems which support wired or wireless telephones or other types of user terminals.

BACKGROUND OF THE INVENTION

Conventional communication system switches, such as private branch exchanges (PBXs) and other premises-based telephone switches, generally support a wide variety of useful features, such as call forwarding, navigable directories, multi-call conferencing, etc. However, access to many of these desirable features is often limited to specialized and expensive communication terminals having a large number of customizable feature buttons, e.g., wired telephone desksets. Nonetheless, many manufacturers are currently producing simple terminals, e.g., mobile telephones and other types of wireless terminals, which include a display but only a very limited number of feature buttons. These simple terminals are generally forced to utilize interfaces designed for conventional telephone sets with no display capabilities.

Although standards exist which specify the interaction between user terminals and corresponding system switches, none have adequately addressed the above-described problem. For example, the Bellcore Analog Display Services Interface (ADSI)standard, Document BR-GR-1273-CORE, Issue 1 Jul. 1998, specifies how display-based user terminals may operate with network equipment. Unfortunately, the specification is quite complex and assumes certain capabilities in the terminals, such as soft-key labels and specialized tone generation. Such capabilities are often not present in a given user terminal, particularly in the simple display-based terminals that are becoming increasingly commonplace.

A number of approaches have been developed which attempt to provide a simple terminal with access to a broad array of features using a display and a limited set of feature buttons. One such arrangement is known as a "Euro-browser." A Euro-browser typically utilizes a display and three function keys, i.e., a scroll-up key, a scroll-down key, and a select key. Available features are scanned using the scroll-up and scroll-down keys, with the display showing the names of the particular features in a sequential manner as the features are scanned. Pressing the select key then causes the currently displayed feature to activate.

Although the above-described Euro-browser feature access techniques are well known in the art, a need remains for improved techniques to implement such enhanced feature access in a communication system switch, using an interface which requires only a conventional keypad and display of a user terminal.

SUMMARY OF THE INVENTION

The present invention provides improved techniques for enhanced feature access in a user terminal of a communication system. In accordance with the invention, a wireless terminal or other type of user terminal in a communication system is configured so as to be permitted to enter an enhanced feature access mode based at least in part on communication of designated information between the user terminal and a corresponding switch of the system. The designated information may comprise, e.g., a feature access code associated with the enhanced feature access mode and entered by a user at the user terminal, or a pre-specified signal transmitted from the user terminal to the switch of the system.

In accordance with another aspect of the invention, the user terminal is provided with improved navigation and activation mechanisms when in the enhanced feature access mode. The navigation and activation mechanisms may utilize a keypad of the user terminal in conjunction with a display of the user terminal to provide access to features of the communication system from the user terminal.

For example, the navigation and activation mechanisms may each utilize disjoint subsets of a given set of keys on a terminal keypad, e.g., an otherwise conventional 12-key keypad. As a more particular example, the keypad may comprise a 12-key keypad including keys for digits "1" through "9", a "*" key and a "#" key. In this case, the "*" key and the "#" key are each used for one of forward or reverse scrolling through a set of available features, while the "1" through "9" keys are used for selection of particular sub-features associated with a given currently-displayed feature. The activation mechanism may comprise a single key, the activation of which is operative to activate a feature currently displayed on the display of the user terminal, e.g., the "0" key of the example 12-key keypad may be used for activation of a given currently-displayed feature. Numerous other keypad configurations and function assignments may be used.

In accordance with a further aspect of the invention, the user terminal and system switch may be configured such that the enhanced feature access mode is temporarily disabled if a particular feature activated via the activation mechanism utilizes a display mode other than that associated with the enhanced feature access mode. For example, if the activated feature includes its own display mode using a different set of function assignments for the keypad, the display mode of the activated feature is enabled while the enhanced feature access mode is temporarily disabled. The enhanced feature access mode may be subsequently re-enabled when the particular activated feature is completed or otherwise no longer activated.

Advantageously, the invention allows the switch-controlled implementation of enhanced feature access, e.g., such as that provided by a Euro-browser mode of operation, using only a conventional keypad and display of a user terminal. Additional feature buttons are not required. These and other features and advantages of the present invention will become more apparent from the accompanying drawings and the following detailed description.

BRIEF DESCRIPTION OF THE DRAWINGS

FIG. 2 is a flow diagram illustrating the manner in which enhanced feature access is provided for a user terminal of the FIG. 1 system in accordance with the invention.

DETAILED DESCRIPTION OF THE INVENTION

Figure 1:
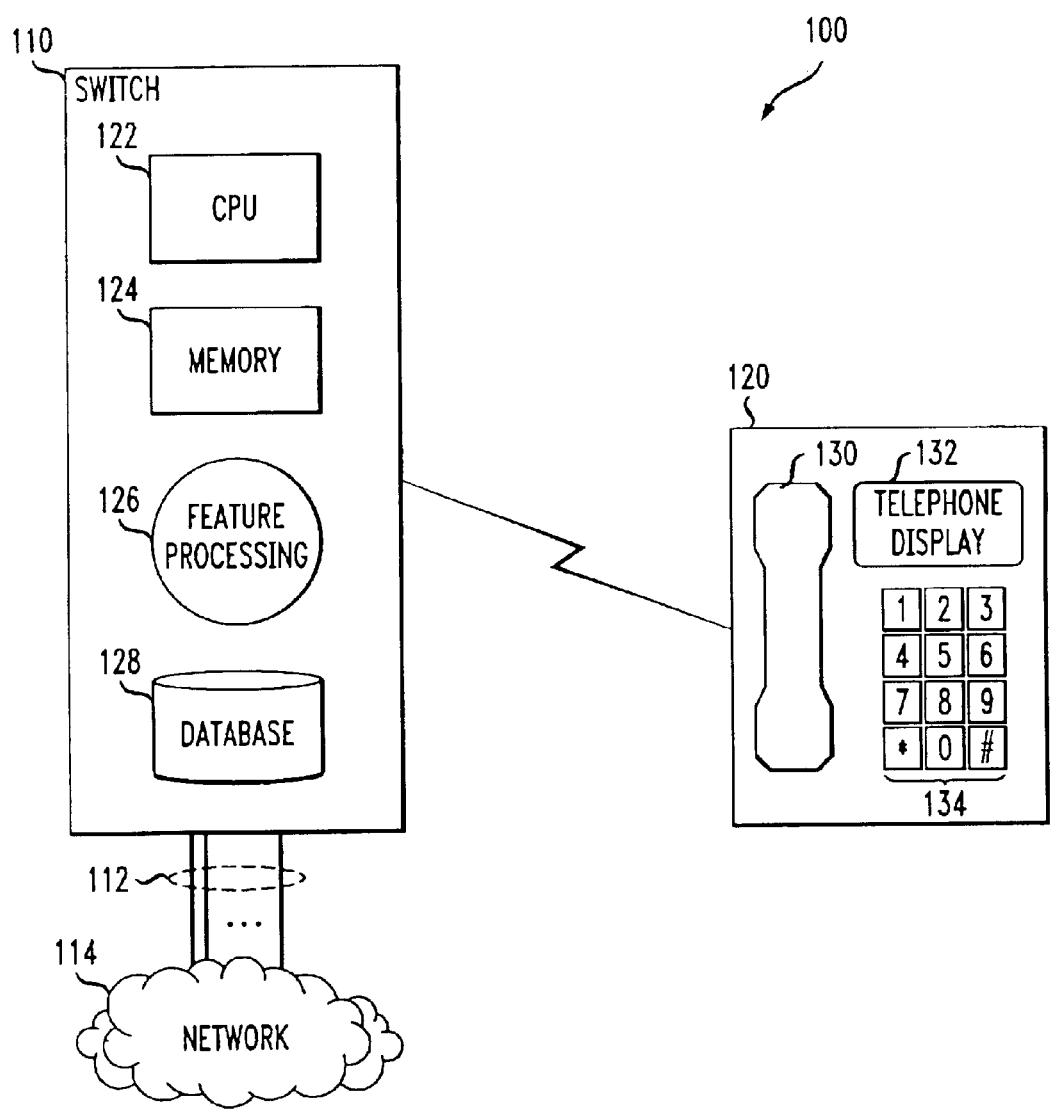
FIG. 1 shows a portion of an exemplary communication system in which the invention may be implemented.

The invention will be illustrated below in conjunction with an exemplary wireless communication system. Although particularly well-suited for use with, e.g., a telephone system which supports both wired deskset terminals and wireless terminals, the invention is not limited to use with any particular type of system or terminal. The disclosed techniques may be used in any communication application in which it is desirable to provide enhanced features for a user terminal, For example, the invention may be applied to handsets for use in cellular and personal communication services (PCS) systems, and to other types of communication terminals, such as wired ISDN terminals.

The word "terminal" as used herein should therefore be understood to include not only wireless terminals as in the illustrative embodiment, but also other types of communication devices, including wireless handsets, personal computers, personal digital assistants (PDAs), wired and wireless desksets, optical communication terminals, or any other type of terminal capable of utilizing the enhanced feature access of the present invention. It should be noted that the invention does not require any particular type of information transport medium between the switch and the user terminal, i.e., the invention may be implemented with any desired type of transport medium. The term "switch" as used herein should be understood to include enterprise switches and other types of telecommunication switches, as well as other types of processor-based communication control devices such as servers, computers, adjuncts, etc.

FIG. 1 shows a portion of an exemplary communication system 100 in which the invention may be implemented. The system 100 includes a switch 110 which is coupled via one or more trunk lines 12 to an external network 114 which may be, e.g., a public switched telephone network (PSTN). The trunk lines 112 carry incoming calls from the network 114 to the switch 110 for processing, and carry outgoing calls from the switch 110 to the network 114. The system 100 further includes a user terminal 120 which is shown illustratively in the form of a telephone. The user terminal 120 may be coupled to the switch 110 via a conventional wired or wireless connection.

The switch 110 in this embodiment includes a central processing unit (CPU) 122, a memory 124, a feature processing element 126, and a database 128. The CPU 122 may be a microprocessor, digital signal processor, microcontroller, application-specific integrated circuit (ASIC) or other type of digital data processor, as well as various portions or combinations of such elements. The memory 124 may be a random access memory (RAM), a read-only memory (ROM) or combinations of these and other types of electronic memory devices.

The feature processing element 126 may be implemented in the form of one or more software programs that are stored in memory 124 or another storage device accessible to the switch 110 and executed by processor 122 in a conventional manner.

The database 128 may be, e.g., an optical or magnetic disk-based storage device, or other conventional storage device associated with or otherwise accessible to the switch 110. The database 128 may be used to store, e.g., feature assignments to particular feature buttons, directory number assignments to corresponding call appearances or direct facility termination keys, access restrictions, and other known administrative information regarding the configuration of the system 100, as well as other types of information.

The feature processing element 126 is operative to support call processing features accessible via the user terminal 120, as will be described in greater detail below in conjunction with the flow diagram of FIG. 2.

The user terminal 120 in FIG. 1 includes a handset 130, a display 132 and a keypad 134. In accordance with the present invention, the keypad 134 in conjunction with the display 132 provide enhanced feature access for the user terminal 120. It should be emphasized that the configuration of user terminal 120 as shown in FIG. 1 is for purposes of illustration only, and should not be construed as limiting the invention to any particular type of terminal.

The switch 110 may include additional elements which are omitted from the figure for simplicity and clarity of illustration. For example, the switch may include a port card for each type of user terminal associated therewith. In addition, although shown as coupled to a single terminal, it will be appreciated by those skilled in the art that the switch 110 is typically configured to support multiple user terminals of different types, e.g., mobile telephones or other wireless terminals, wireless personal computers, video telephones or other advanced terminals, etc.

Also associated with the switch 110 may be an administrator terminal which may be used to program the operation of the switch 110 during a system administration, e.g., an initial set-up and configuration of the system or a subsequent system-level or user-level reconfiguration.

Other devices may be associated with the switch 110, such as an adjunct feature server. Such an adjunct may be physically incorporated within the switch, and may be partially or completely implemented using other switch elements such as CPU 122 and memory 124.

The present invention provides enhanced feature access in the user terminal 120 through the use of keypad 134 in conjunction with display 132. In the illustrative embodiment, the enhanced feature access is implemented in the form of a Euro-browser, but in a manner which requires only the keypad 134 and the display 132 of the user terminal 120.

FIG. 2 is a flow diagram illustrating the manner in which the enhanced feature access is provided for the user terminal 120 via the switch 110 in the system 100 of FIG. 1. In the illustrative embodiment, a Euro-browser type of enhanced feature access mode is provided as an option to a user of the user terminal 120.

In step 200 of FIG. 2, the enhanced feature access mode is enabled as a user option at administration time. When this user option is enabled, a new feature access code (FAC), e.g., start Euro-browser, may appear on a feature access form used in conjunction with an administration of the user terminal 120. Such a feature access form may be, e.g., part of a conventional dial plan form. The user terminal 120 in this example is assumed to be administered with up to nine feature buttons, one of which must be designated as a so-called "normal" feature button, e.g., a button associated with a normal mode involving normal display of call information. The nine administered feature buttons in the illustrative embodiment correspond to keys "1" through "9" of the conventional 12-key keypad 134 on terminal 120.

In step 202, the user terminal 120 enters the enhanced feature access mode. Entry to the enhanced feature access mode may be initiated via entry of a corresponding feature access code at the user terminal 120. As another example, entry to the enhanced feature access mode may be performed automatically upon receipt of a particular signal from the user terminal. One such signal may be, e.g., a digital enhanced cordless telephone (DECT) "service" digit (0×18) received in the switch during a period of time for which the switch is listening to dial tone from the user terminal.

It should be noted that certain types of terminals may not generate the above-referenced service digit. For example, neither of the current DECT access server (DAS) wireless telephone terminal model numbers C911 or C922 from Philips Corp. of the Netherlands generate this service digit. However, the C911 DECT wireless terminal can generate a "pause" digit (0×5) and the C922 DECT wireless terminal can generate an "internal call" digit (0×17). Since these latter two types of digits generally have no significant meaning to the corresponding switch, the switch could utilize these digits in addition to the service digit as providing an indication of entry of a particular user terminal into the enhanced feature access mode. Other types of signals could also be used. It should again be noted that the specific terminals referred to above are examples only. As previously noted, and the invention can of course be implemented using many other types of terminals.

When in the enhanced feature access mode, the keypad 134 and display 132 of the user terminal 120 are used to perform enhanced feature navigation and activation, as will be described below.

Step 204 indicates that a user can navigate among a set of available features when in the enhanced feature access mode by using the keys "1" through "9", "*" and "#."

Step 206 indicates that the currently-displayed feature is activated using the "0" key.

The display 134 of user terminal 120 always shows the current feature that would be activated if the "0" key were pressed. The "*" and "#" keys navigate backward and forward, respectively, through the list of displayed features, while the keys "1" through "9" select for display the potential administered sub-features one through nine, if any, that are associated with a given currently-displayed feature.

Advantageously, the particular navigation and activation mechanisms shown in steps 204 and 206 require only the conventional 12-key keypad 134 in conjunction with the display 132. However, it should be understood that these particular navigation and activation mechanisms are by way of example only, and the invention can utilize other types of such mechanisms.

In step 208, a determination is made as to whether a given activated feature has its own display mode, i.e., a display mode with a set of button function assignments that are different than those of the enhanced feature access mode as described in steps 204 and 206. When a particular activated feature, such as an integrated directory, has its own display mode, the enhanced feature browser mode is temporarily suspended, as shown instep 210. This allows the activated feature to use the keypad 134 in accordance with its display mode.

If the particular activated feature does not have its own display mode, the user terminal 120 remains in the enhanced feature access mode, with subsequent navigation and activation implemented as in steps 204 and 206.

The enhanced feature access mode may be subsequently re-enabled when the particular activated feature is completed or otherwise no longer activated.

More particularly, in order to return to the enhanced feature access mode from another display mode of the type described above, the user terminal 120 may send a designated signal to the switch. Examples of such signals include a DECT "recall" digit (0×15) or a designated "drop" button code. Other types of signals could also be used. The process of FIG. 2 may thus return from the temporary suspension in step 210 to the feature navigation of step 204.

The user terminal 120 can exit the enhanced feature access mode from state 204 in any of a number of different ways. For example, the user terminal 120 can exit the enhanced feature access mode by going on-hook, by activating the above-noted "normal" feature, or by activating a feature that launches a real call as opposed to a feature access code type call.

It should be note that, in many applications, only a subset of a given set of available features may be accessible via the enhanced feature access mode. For example, call appearance-like buttons and similar feature indicators are generally not made accessible in the illustrative embodiment, although such features could be made accessible in other embodiments.

In addition, certain features such as call forwarding and send-all-calls have long-lived activation states. For such features, the enhanced feature access mode may indicate activation of the corresponding feature by an appropriate visual indication, such as an asterisk preceding or following the name of the feature on the display.

One or more of the processing functions associated with the enhanced feature access control in the illustrative embodiment of the invention may be implemented in whole or in part in the serving switch, e.g., in the feature processing element 126 of switch 110 utilizing CPU 122 and memory 124. Other suitable combinations of hardware and/or software may be used to implement the enhanced feature access in accordance with the invention.

The user terminal 120 includes suitable circuitry for receiving and decoding signals and other information received from the switch 110, and executing the corresponding commands. Such receiving, decoding and execution circuitry may include, e.g., a conventional processor and memory, and may be implemented in a straightforward manner.

It should again be emphasized the above-described embodiment is illustrative only. Alternative embodiments may utilize different switch and user terminal configurations, different techniques for entering and exiting the enhanced feature access mode, and different navigation and activation mechanisms. These and numerous other alternative embodiments within the scope of the following claims will be apparent to those skilled in the art.

What is claimed is:

1. A method of providing enhanced feature access in a display-based mobile wireless user terminal of a communication system, the method comprising the steps of:

configuring the mobile wireless user terminal so as to permit the user terminal to enter an enhanced feature access mode based at least in part on a communication of designated information between the user terminal and a corresponding switch of the system; and providing navigation and activation mechanisms within the user terminal as part of the enhanced feature access mode, the navigation and activation mechanisms utilizing a keypad of the user terminal in conjunction with a display of the user terminal to provide access to features of the communication system not otherwise accessible utilizing the keypad, the keypad comprising a plurality of numeric keys and a plurality of non-numeric keys and being utilizable in entering a telephone number to be dialed.

2. The method of claim 1 wherein the user terminal comprises a wireless terminal.

3. The method of claim 1 wherein the designated information comprises a feature access code associated with the enhanced feature access mode and entered by a user at the user terminal.

4. The method of claim 1 wherein the designation information comprises a pre-specified signal transmitted from the user terminal to the switch of the system.

5. The method of claim 1 wherein the navigation mechanism uses a first subset of the keys of the keypad and the activation mechanism uses a second subset of the keys of the keypad, the first and second subsets being disjoint subsets.

6. The method of claim 1 wherein the activation mechanism comprises a single key the activation which is operative to activate a feature currently displayed on the display of the user terminal.

7. The method of claim 1 wherein the keypad comprises a 12-key keypad including keys for digits "1" through "9", a "*" key and a "#" key.

8. The method of claim 7 wherein the "*" key and the "#" key are each used for one of forward or reverse scrolling through a set of available features.

9. The method of claim 7 wherein the "1" through "9" keys are used for selection of particular sub-features associated with a given currently-displayed feature.

10. The method of claim 7 wherein the "0" key is used for activation of a given currently-displayed feature.

11. The method of claim 1 wherein the enhanced feature access mode is exited based at least in part on detection of designated activity at the user terminal.

12. The method of claim 1 wherein the enhanced feature access mode is temporarily disabled if a particular feature activated using the activation mechanism utilizes a display mode other than that associated with the enhanced feature access mode.

13. The method of claim 12 wherein the enhanced feature access mode is subsequently re-enabled when the particular activated feature is completed or the particular activated feature is otherwise no longer activated.

14. An apparatus comprising:
a display-based mobile wireless user terminal of a communication system, the mobile wireless user terminal being operative to enter an enhanced feature access mode based at least in part on a communication of designated information between the user terminal and a corresponding switch of the system, the enhanced feature access mode having navigation and activation mechanisms associated therewith, the navigation and activation mechanisms utilizing a keypad of the user terminal in conjunction with a display of the user terminal to provide access to features of the communication system not otherwise accessible utilizing the keypad, the keypad comprising a plurality of numeric keys and a plurality of non-numeric keys and being utilizable in entering a telephone number to be dialed.

15. The apparatus of claim 14 wherein the user terminal comprises a wireless terminal.

16. The apparatus of claim 14 wherein the designated information comprises a feature access code associated with the enhanced feature access mode and entered by a user at the user terminal.

17. The apparatus of claim 14 wherein the designation information comprises a pre-specified signal transmitted from the user terminal to the switch of the system.

18. The apparatus of claim 14 wherein the navigation mechanism uses a first subset of the keys of the keypad and the activation mechanism uses a second subset of the keys of the keypad, the first and second subsets being disjoint subsets.

19. The apparatus of claim 14 wherein the activation mechanism comprises a single key the activation of which is operative to activate a feature currently displayed on the display of the user terminal.

20. The apparatus of claim 14 wherein the keypad comprises a 12-key keypad including keys for digits "1" through "9", a "*" key and a "#" key.

21. The apparatus of claim 20 wherein the "*" key and the "#" key are each used for one of forward or reverse scrolling through a set of available features.

22. The apparatus of claim 20 wherein the "1" through "9" keys are used for selection of particular sub-features associated with a given currently-displayed feature.

23. The apparatus of claim 20 wherein the "0" key is used for activation of a given currently-displayed feature.

24. The apparatus of claim 14 wherein the enhanced feature access mode is exited based at least in part on detection of designated activity at the user terminal.

25. The apparatus of claim 14 wherein the enhanced feature access mode is temporarily disabled if a particular feature activated using the activation mechanism utilizes a display mode other than that associated with the enhanced feature access mode.

26. The apparatus of claim 25 wherein the enhanced feature access mode is subsequently re-enabled when the particular activated feature is completed or the particular activated feature is otherwise no longer activated.

27. An apparatus comprising:
a communication system switch operative to support enhanced feature access in a display-based mobile wireless user terminal of a communication system, the switch permitting the mobile wireless user terminal to enter an enhanced feature access mode based at least in part on a communication of designated information between the user terminal and a corresponding switch of the system, the enhanced feature access mode having navigation and activation mechanisms associated therewith, the navigation and activation mechanisms utilizing a keypad of the user terminal in conjunction with a display of the user terminal to provide access to features of the communication system not otherwise accessible utilizing the keypad, the keypad comprising a plurality of numeric keys and a plurality of non-numeric keys and being utilizable in entering a telephone number to be dialed.

28. An article of manufacture comprising:
a machine-readable storage medium storing one or more programs for providing enhanced feature access in a display-based mobile wireless user terminal of a communication system, the one or more programs when executed permitting the mobile wireless user terminal to enter an enhanced feature access mode based at least in part on a communication of designated information between the user terminal and a corresponding switch of the system, the enhanced feature access mode having navigation and activation mechanisms associated therewith, the navigation and activation mechanism utilizing a keypad of the user terminal in conjunction with a display of the user terminal to provide access to features of the communication system not otherwise accessible utilizing keypad, the keypad comprising a plurality of numeric keys and a plurality of non-numeric keys and being entering a telephone number to be dialed.

* * * * *

UNITED STATES PATENT AND TRADEMARK OFFICE
CERTIFICATE OF CORRECTION

PATENT NO. : 6,920,339 B1 Page 1 of 1
DATED : July 19, 2005
INVENTOR(S) : V.H. Choy et al.

It is certified that error appears in the above-identified patent and that said Letters Patent is hereby corrected as shown below:

<u>Column 8,</u>
Line 63, after "being", insert -- utilizable in --.

Signed and Sealed this

Thirtieth Day of August, 2005

JON W. DUDAS
*Director of the United States Patent and Trademark Office*